United States Patent [19]

Koma

[11] Patent Number: 5,403,033
[45] Date of Patent: Apr. 4, 1995

[54] AIR BAG MOUNTING STRUCTURE/METHOD THEREFOR

[75] Inventor: Yasuyuki Koma, Columbus, Ohio

[73] Assignee: Honda Giken Kogyo Kabushiki Kaisha, Tokyo, Japan

[21] Appl. No.: 121,527

[22] Filed: Sep. 16, 1993

[51] Int. Cl.⁶ .............................................. B60R 21/16
[52] U.S. Cl. .................................. 280/728 A; 280/732
[58] Field of Search ................ 280/728 A, 728 B, 732

[56] References Cited

U.S. PATENT DOCUMENTS

| | | | |
|---|---|---|---|
| 4,925,209 | 5/1990 | Sakuri | 280/732 |
| 5,096,221 | 3/1992 | Combs et al. | 280/728 B |
| 5,230,530 | 7/1993 | Iriyama et al. | 280/732 |

*Primary Examiner*—Kenneth R. Rice

[57] ABSTRACT

A mounting structure for a passenger air bag assembly includes a retainer housing having a compartment for accommodating a folded air bag. The retainer housing is mounted beneath an instrument panel of a vehicle and is disposed adjacent to an opening therein for permitting the folded air bag to be selectively deployed through the opening and into a passenger compartment of a vehicle. A closure member is provided for covering the opening in the instrument panel, the closure member includes an overlapping edge for engaging an area of the instrument panel surrounding the opening. A fixing frame is mounted on the instrument panel for securing the overlapping edge of the closure member to the area surrounding the opening in the instrument panel. A support beam is mounted beneath the instrument panel for supporting the retainer housing. The support beam includes a first end and a second end with at least one of the first and the second ends being affixed to a frame member of the vehicle. An adjustment bracket is disposed between the retainer housing and the support beam for adjustably fixing the retainer housing to the support beam for aligning the closure member relative to the opening in the instrument panel.

17 Claims, 5 Drawing Sheets

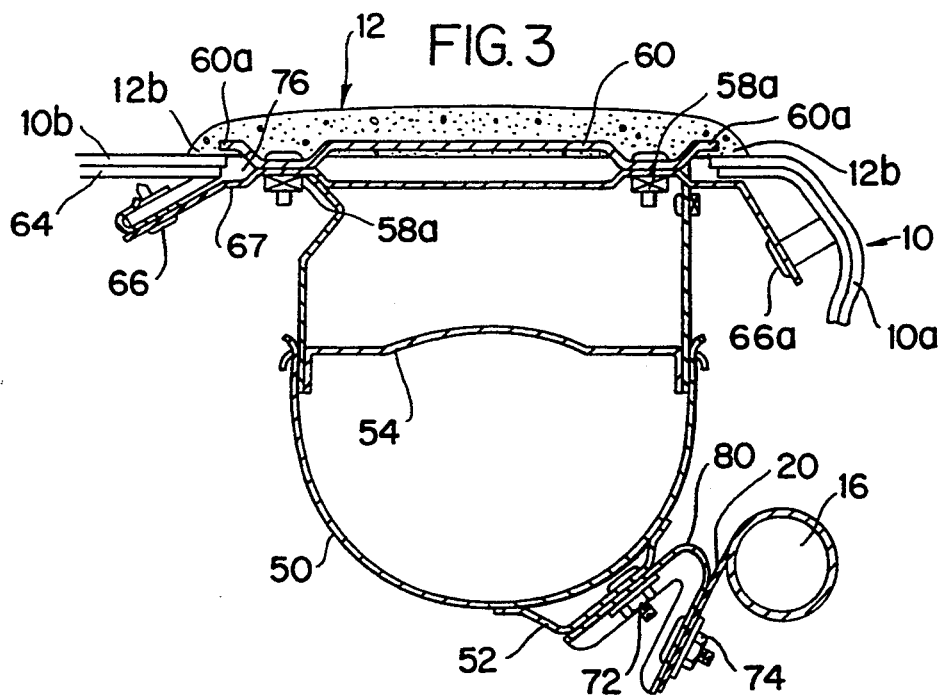
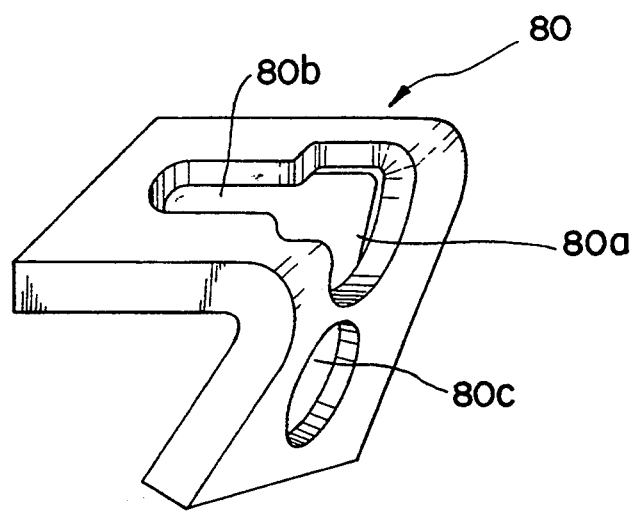

5,403,033

AIR BAG MOUNTING STRUCTURE/METHOD THEREFOR

BACKGROUND OF THE INVENTION

1. Field of the Invention

A mounting structure is disclosed for mounting a closure member of a passenger air bag module assembly relative to an opening in an instrument panel for providing a tight engagement without any uneven gaps.

2. Description of Background Art

Hithertofore, a closure member for an air bag assembly is known wherein the closure member is affixed to a retainer disposed below the instrument panel. The closure member is only affixed to the retainer and is not directly affixed to an instrument panel of the vehicle. In this type of closure member, an uneven gap may occur between the closure member and the instrument panel of the vehicle due to the positioning of the retainer relative to an opening in the instrument panel.

A second type of closure member for an air bag assembly is also known wherein the closure member is formed as a one piece unit with the entire instrument panel. If the air bag is deployed, the entire instrument panel must be replaced. The replacement of the entire instrument panel is an expensive and time consuming procedure.

SUMMARY AND OBJECTS OF THE INVENTION

An object of the present invention is to provide a mounting structure for an air bag module assembly wherein the closure member is secured to the instrument panel for providing a tight fit without causing any gaps therebetween.

Another object of the present invention is to provide a closure member for an air bag assembly that may be easily replaced on an instrument panel after the air bag is deployed.

A further object of the present invention is to provide a fixing frame member affixed to the closure member and to the instrument panel for biasing the closure member into engagement with an area of the instrument panel surrounding the opening through which an air bag is deployed into the passenger compartment of a vehicle.

A still further object of the present invention is to provide an adjustment bracket positioned between a retainer housing for the air bag assembly and a support bracket for adjusting the positioning of the retainer housing and the closure member relative to the opening in the instrument panel.

These and other objects of the present invention are achieved by providing a mounting structure for a passenger air bag assembly includes a retainer housing having a compartment for accommodating a folded air bag. The retainer housing is mounted beneath an instrument panel of a vehicle and is disposed adjacent to an opening therein for permitting the folded air bag to be selectively deployed through the opening and into a passenger compartment of a vehicle. A closure member is provided for covering the opening in the instrument panel, the closure member includes an overlapping edge for engaging an area of the instrument panel surrounding the opening. A fixing frame is mounted on the instrument panel for securing the overlapping edge of the closure member to the area surrounding the opening in the instrument panel. A support beam is mounted beneath the instrument panel for supporting the retainer housing. The support beam includes a first end and a second end with at least one of the first and the second ends being affixed to a frame member of the vehicle. An adjustment bracket is disposed between the retainer housing and the support beam for adjustably fixing the retainer housing to the support beam for aligning the closure member relative to the opening in the instrument panel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a cross-sectional view of another embodiment of the present invention wherein a specialized adjustment bracket is used for positioning the air bag module assembly;

FIG. 4 is an enlarged view of the specialized adjustment bracket illustrated in FIG. 3;

DETAILED DESCRIPTION OF THE PREFERRED EMBODIMENTS

Figure 1:
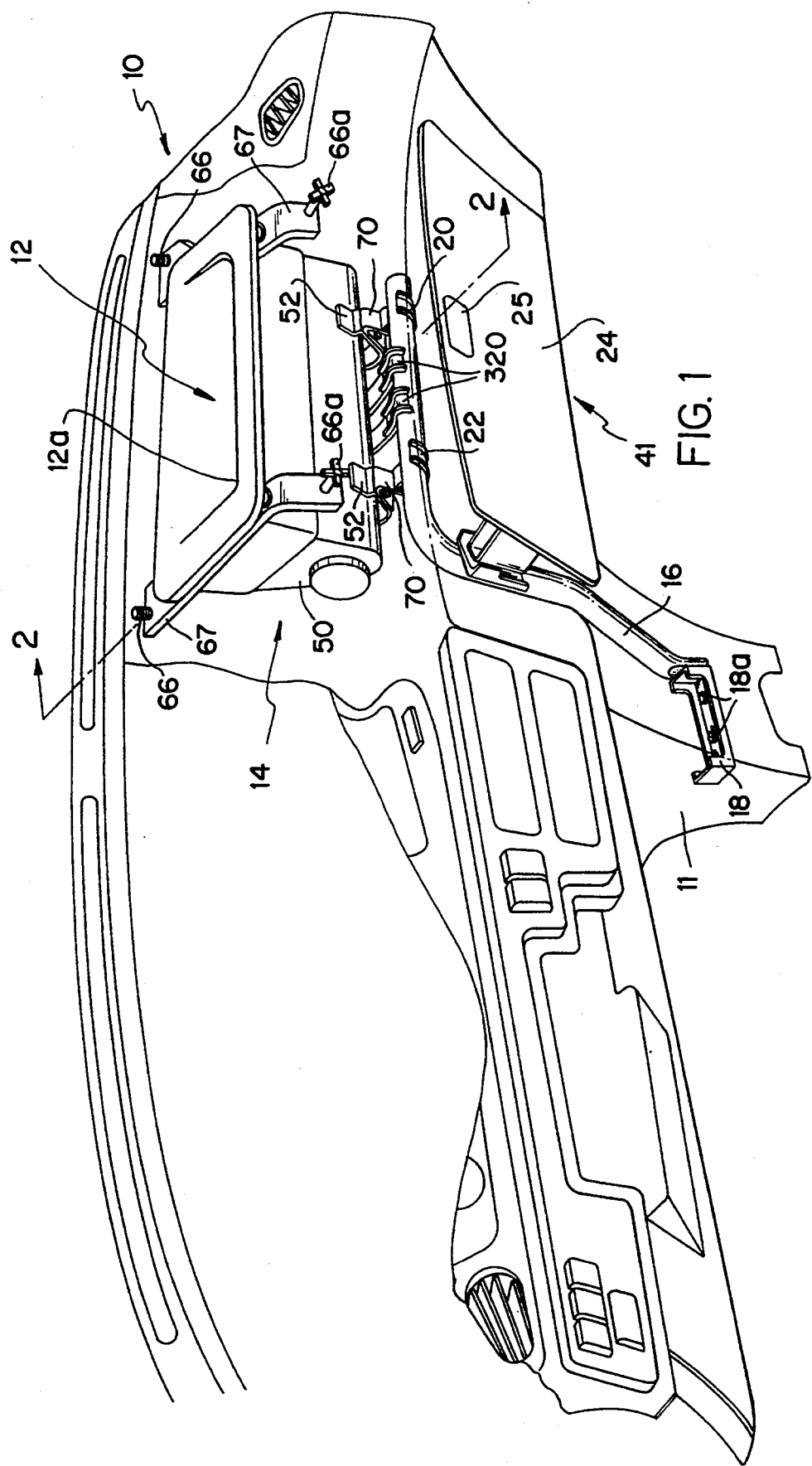
FIG. 1 is a partial cutaway view illustrating the air bag mounting structure according to the present invention positioned adjacent to a vehicle instrument panel.

As illustrated in FIG. 1, a vehicle instrument panel 10 is provided which includes an air bag closure member 12 operatively disposed adjacent to an occupant's seat of the vehicle. The air bag closure member 12 is disposed adjacent to an air bag detonating mechanism 14 which is disposed within the vehicle instrument panel 10. Bolts and other fastening mechanisms are provided for securing the air bag detonating mechanism 14 relative to the vehicle body.

A support bracket 16 is operatively secured to a vehicle frame 11 by means of a bracket 18. The bracket 18 is secured by means of screws 18a into the vehicle body frame (not shown) behind a garnish panel 11. Brackets 20, 22 are positioned on the bracket 18 for securing a second end of the support bracket 16 relative to the air bag detonating mechanism 14.

FIG. 1 is a partial cutaway view illustrating a number of elements which are disposed beneath the vehicle instrument panel 10. A closure member 24 for the glove box 41 forms a continuous front surface disposed adjacent to the vehicle instrument panel 10 when the closure member 24 is in the closed position. An opening mechanism 25 for the glove box 41 is provided to permit an occupant to gain access to the interior of the glove box 41. FIG. 1 merely illustrates certain components which are disposed behind the glove box 41 for purpose of illustration only.

Figure 2:
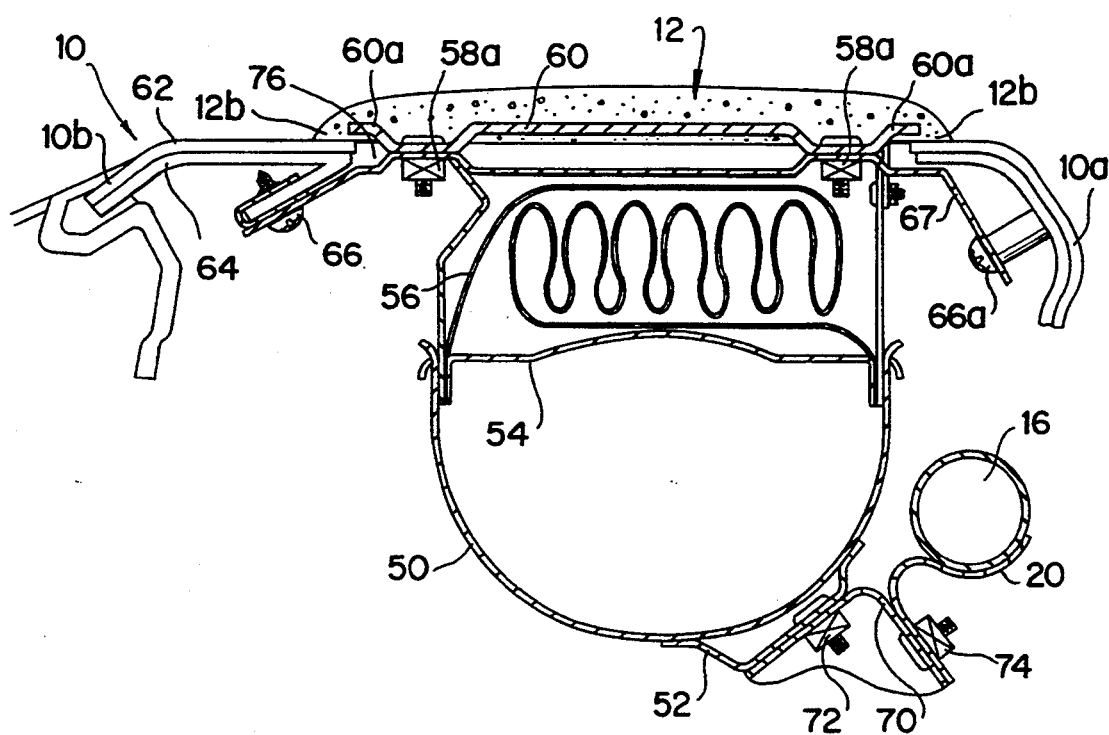
FIG. 2 is a cross-sectional view taken along line 2—2 in FIG. 1.

FIGS. 2 and 3 are cross-sectional views illustrating embodiments of the present invention. Like numerals utilized in FIGS. 2 and 3 refer to like elements. A retaining housing member 50, which forms part of the air bag detonating mechanism, is disposed for containing an inflater assembly which is detonated to provide gas through a plurality of apertures disposed in a retainer dividing wall 54 into the interior space of an air bag 56. As the inflater assembly is detonated, gas rushes through apertures in the retaining wall 54 to inflate the air bag 56, thus causing the air bag to rapidly expand through a slit 12a, as illustrated in FIG. 1. If a vehicle is in an accident and the inflater assembly is detonated, the air bag 56 will expand through the slit 12a in the closure member 12 to fill the interior space of a vehicle adjacent to a passenger so as to prevent the upper portion of the passenger's body from abutting against the windshield.

The air bag closure member 12 includes a base plate lid 60 which is secured to a fixing frame 67 by means of nuts and bolts 58a. Both the base plate lid 60 and the fixing frame 67 are positioned at each side of the closure member 12 for securing the closure member 12 to an area of the instrument panel 10 adjacent to an opening 76 for providing a tight fit therebetween. The central section of the closure member 12 is constructed of a cushion material, such as urethane foam, for permitting an air bag to easily be deployed therethrough. The fixing frame 67 extends along a narrow area from one side of the instrument panel 10a to a second side of the instrument panel 10b. The second side of the instrument panel 10b is disposed adjacent to the windshield of a vehicle. As illustrated in FIGS. 2 and 3, the nuts and bolts 58a are utilized to secure the air bag closure member 12, the base plate lid 60 and the fixing frame 67 together. The fixing frame 67 is mounted on an instrument panel plate 64 by means of a lock screw 66. In addition, the fixing frame 67 is secured to the first end of the instrument panel 10a by means of a screw 66a. The retainer housing 50 is secured to the fixing frame 67.

The closure member 12 includes an overlapping edge 12b for engaging an area of the instrument panel adjacent to the opening 76. In addition, the base plate lid 60 includes and engaging edge 60a. The resilient fixing frame 67 biases the overlapping edge 12b of the closure member 12 and the engaging edge 60a into a tight fit with the instrument panel 10.

As illustrated in FIG. 2, a bracket 52 is secured to a lower portion of the retainer housing 50. An adjustment bracket 70 is secured to the bracket 52 by means of a nut and bolt 72. A nut and bolt 74 are utilized to affix the adjustment bracket 70 to the bracket 20 secured to the support bracket 16. The adjustment bracket 70 includes apertures disposed therein to permit the retainer housing 50 to be moved in vertical and horizontal directions relative to the opening 76 in the instrument panel 10. In other words, as the retainer housing 50 is positioned within the instrument panel 10, the retainer housing 50 must be accurately positioned relative to the opening 76. The adjustment bracket 70 permits limited vertical and horizontal adjustment of the retainer housing 50 to permit accurate adjusting of the retainer housing 50 relative to the opening 76. In this way, the air bag closure member 12 provides a tight fit relative to the instrument panel 10 to secure the air bag closure member 12 in a precise location. The locking screws 66 and 66a are provided for securing the air bag closure member 12 relative to the instrument panel 10.

As illustrated in FIG. 3, like elements are set forth with the same reference numerals. An adjustment bracket 80 is provided which is disposed at a distinct angle relative to the adjustment bracket 70. The adjustment bracket 80 is designed to permit vertical and horizontal adjustment of the retainer housing 50 relative to the aperture 76 in the instrument panel 10. A nut and bolt 72 secures one leg of the adjustment bracket 80 relative to a bracket 52 secured to the retaining housing 50. A nut and bolt 74 secures a second leg of the adjustment bracket 70 relative to a bracket 20 secured to the support bracket 16.

As illustrated in FIG. 4, the adjustment bracket 80 includes an enlarged-aperture 80a for accommodating either the head portion or the nut portion of a nut and bolt. An elongated slot 80b is provided to permit limited horizontal and vertical movement of the retainer housing 50 relative to the aperture 76 in the instrument panel 10. In addition, an elongated aperture 80c is provided for accommodating a bolt for securing the adjustment bracket 80 to the bracket 20 affixed to the support bracket 16. The aperture 80c is provided for permitting limited horizontal and vertical adjustment of the retainer housing 50 relative to the aperture 76 in the instrument panel 10.

Figure 5:
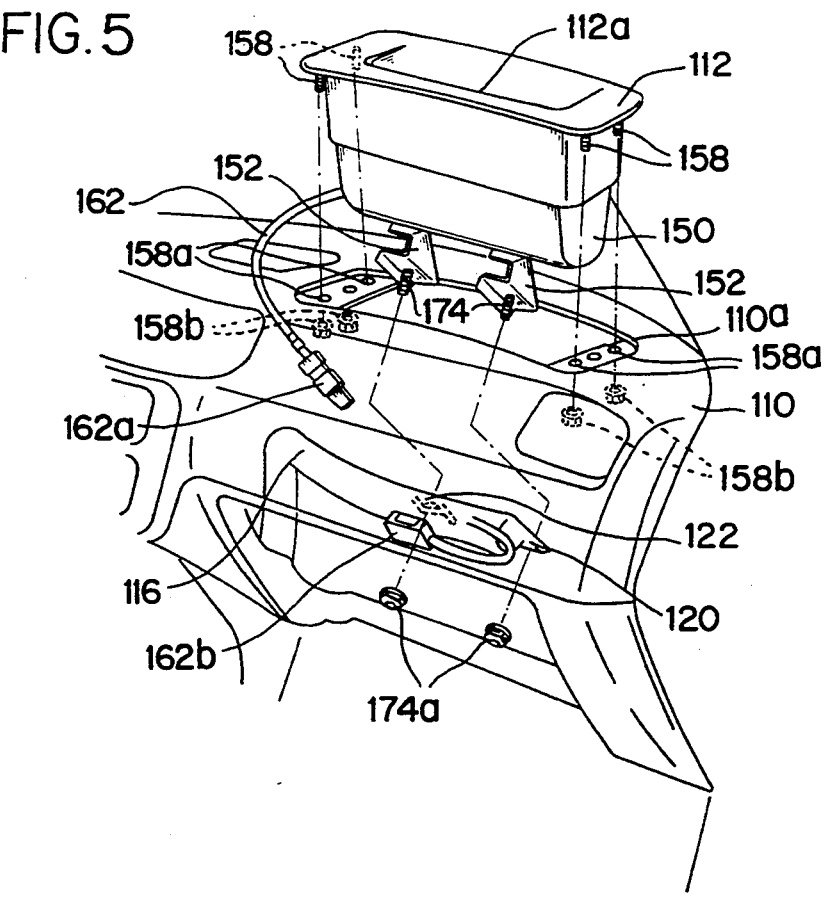
FIG. 5 is an exploded view illustrating the relationship of the air bag module assembly and the instrument panel of a vehicle.

FIG. 5 illustrates an exploded view wherein a front passenger air bag assembly 90 includes an air bag closure member 112 and a retainer housing 150. Bolts 158 are provided for securing the air bag closure member 112 relative to apertures 158a disposed in the instrument panel 110. Nuts 158b secure the bolts 158 of the air bag closure 112 relative to the instrument panel 110. A connector cord 162 is provided with a coupling 162a for affixing the inflater assembly disposed within the retainer housing 150 relative to a plug 162b secured to the vehicle frame. A support bracket 116 is provided with fittings 120, 122 for securing the bolts 174 affixed to the brackets 152 to the support bracket 116. Nuts 174a are provided for securing the bolts relative to the support bracket 116.

In the embodiment illustrated in FIG. 5, a recess portion 110a is provided in the instrument panel 110 for receiving the air bag closure member 112. In this embodiment, a portion of the air bag closure member 112 will be positioned within the recess 110a for providing a tight fit of the air bag closure member 112 relative to the instrument panel 110.

Figure 6:
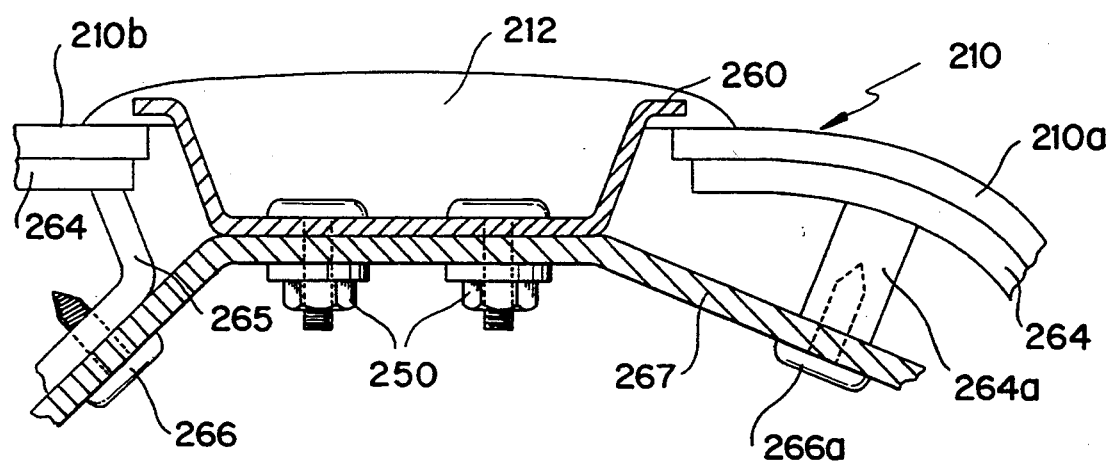
FIG. 6 is a cross-sectional view illustrating the positioning of the closure member relative to the instrument panel of a vehicle.

FIG. 6 illustrates another embodiment of the present invention wherein a base plate lid 260 is designed to include a recess portion at the central portion of the base plate lid 260. An air bag closure member 212 includes an enlarged area for providing an area to supply urethane foam or other cushion padding material. A fixing frame 267 is secured to the base plate lid 260 by means of nuts and bolts 250. An instrument panel 210 includes a first end adjacent to the passenger compartment 210a and a second end 210b disposed adjacent to the windshield for the vehicle. An instrument panel plate 264 is provided beneath the instrument panel 210. A bracket 265 is secured at one end of the instrument panel plate 264 for permitting the fixing frame 267 to be secured thereto by means of a locking screw 266. Similarly, a screw 266a is received within a mounting member 264a secured to the instrument panel plate 264. The fixing frame 267 and the base plate lid 260 are positioned at each side of an aperture 276 in the instrument panel 210. In this way, the air bag closure member 212 is secured relative to the instrument panel 210 at the side portions thereof. The central portion of the air bag closure member which includes a slit disposed therein is free of any metal surfaces which would inhibit the extension of the air bag out of the air bag closure member 212.

Figure 7:
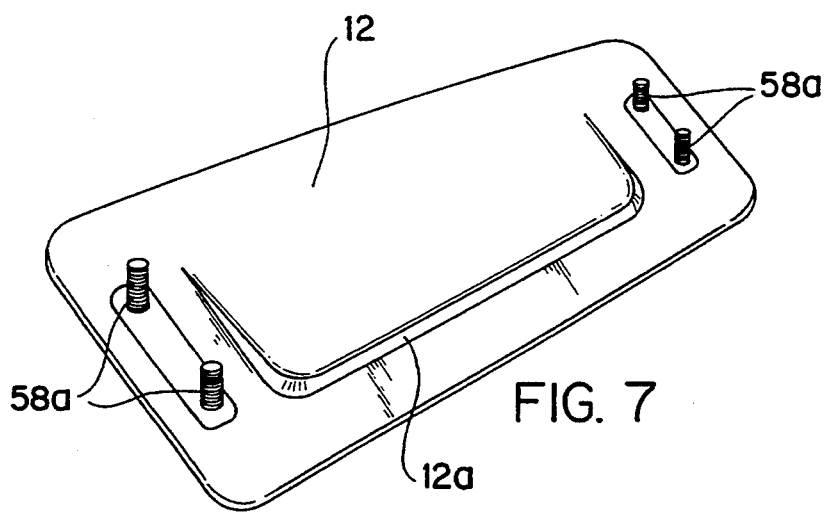
FIG. 7 is a rear view of the closure member illustrating the connecting bolts projecting therefrom.

FIG. 7 illustrates a rear view of an air bag closure member 12 which illustrates the slit 12a disposed therein. Bolts 58a project from the air bag closure member 12. The bolts 58a are designed to be secured by means of nuts to the instrument panel of a vehicle.

Figure 8:
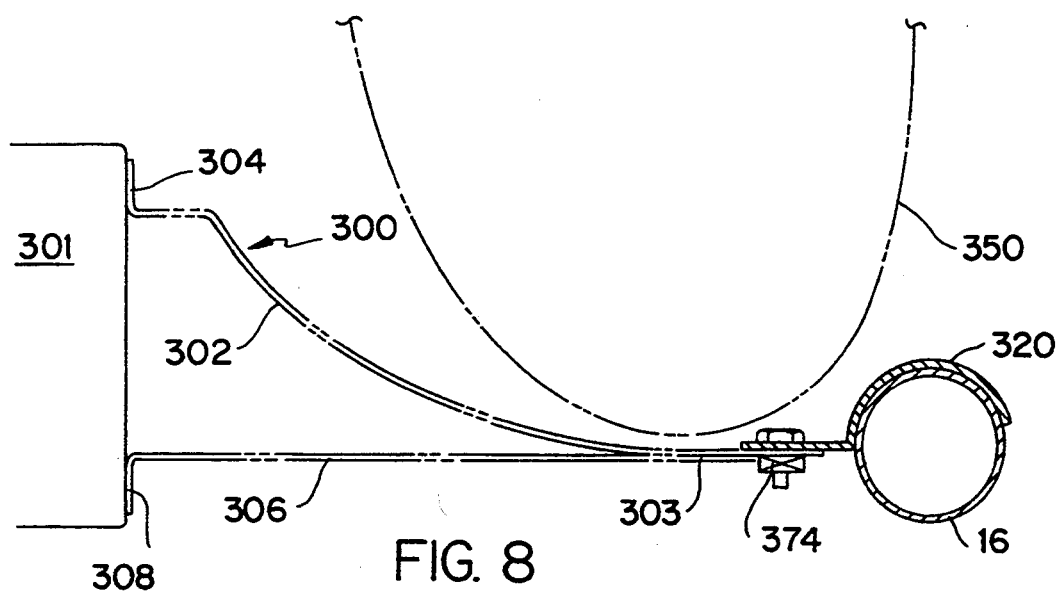
FIG. 8 is a cross-sectional view of a bracket for securing the air bag module assembly to the instrument panel of a vehicle.

FIG. 8 illustrates a hanger 300 which is secured to a portion of the vehicle cowl box frame 301 beneath the instrument panel. The hanger 300 includes an upper portion 302 affixed at one end 304 to the frame 301. A second support 306 is provided for the hanger 300 which includes an end 308 secured to the frame 301. The hanger 300 includes an end 303 secured to the retainer housing 350. A support bracket 16 is provided adjacent to the retainer housing 350. A bracket 320 is mounted on the support bracket 16. A nut and a bolt 374 are provided for securing the ends 301 of the hanger 300 to the bracket 320, and thus, to the support bracket 16.

As the air bag closure member 12, 112, and 212 are secured within an instrument panel of a vehicle, an individual may very easily adjust the vertical and horizontal positioning of the retainer housing 50 relative to the aperture in the instrument panel. The air bag closure member 12, 112 and 212 may be very tightly secured relative to the instrument panel by means of the resilient fixing frame 67 and 267. This provides a tight fit for the air bag closure member 12, 112 and 212 relative to the instrument panel to provide a very pleasing appearance for the air bag closure member.

In operation, if the vehicle which contains the retainer housing and air bag closure member of the present invention is involved in an accident, the inflater assembly is detonated to release gas which penetrates through the apertures in the retainer dividing wall 54 and instantaneously inflates the air bag 56. The inflated air bag 56 is forced through the aperture 12a, 112a to extend into the interior compartment of a vehicle to maintain a distance between an occupant in the passenger seat and the windshield of the vehicle. After the air bag is detonated, the entire retainer housing 50 and air bag closure member 12 may be removed therefrom by merely releasing the nuts, bolts and screws which secure the air bag closure member 12 and the retainer housing relative to the vehicle. Thereafter, a replacement retainer housing and air bag closure member may very easily be replaced within the same space occupied by the original retainer housing and air bag closure member by merely securing the replacement retainer housing and air bag closure member in the same orientation by using the same brackets as originally employed. Thus, the present invention provides a very easy adjustment for changing the air bag closure member and the retainer housing after an air bag is detonated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting structure for a passenger air bag assembly comprising:
    a retainer housing including a compartment for accommodating a folded air bag, said retainer housing being adapted to be mounted beneath an instrument panel of a vehicle and disposed adjacent to an opening therein for permitting said folded air bag to be selectively deployed through said opening and into a passenger compartment of a vehicle;
    a closure member for covering said opening in said instrument panel, said closure member having an overlapping edge for engaging an area of said instrument panel surrounding said opening;
    a fixing frame mounted on said instrument panel for securing the overlapping edge of said closure member to the area surrounding said opening in the instrument panel;
    a support beam mounted beneath said instrument panel for supporting said retainer housing, said support beam including a first end and a second end, at least one of said first and said second ends being affixed to a frame member of the vehicle; and
    an adjustment bracket disposed between said retainer housing and said support beam for adjustably fixing the retainer housing to the support beam for aligning said closure member relative to said opening in the instrument panel.

2. The mounting structure according to claim 1, wherein said fixing frame is constructed of a resilient material for biasing said closure member to engage said area adjacent to the opening in the instrument panel.

3. The mounting structure according to claim 1, wherein said closure member includes an outer surface layer, a cushion pad layer and a base plate for reinforcing side edges of the closure member.

4. The mounting structure according to claim 3, wherein said cushion pad layer is constructed of a urethane foam material.

5. The mounting structure according to claim 3, wherein said base plate includes an engaging edge section for engaging the area adjacent to the opening in the instrument panel.

6. The mounting structure according to claim 1, wherein said adjustment bracket includes a first leg having an elongated aperture disposed therein and a second leg affixed to said first leg at a predetermined angle relative thereto, said second leg including a second aperture disposed therein, said first and second apertures facilitating an adjustment of said retainer housing and said closure member relative to said opening in said instrument panel.

7. The mounting structure according to claim 1, and further including a hanger for mounting said second end of said support bracket relative to a frame member of the vehicle.

8. A method of installing a passenger air bag assembly to a support beam disposed beneath an instrument panel of a vehicle for supporting said retainer housing, said support beam including a first end and a second end, with at least one of said first and said second ends being affixed to a frame member of the vehicle, said support beam including an adjustment bracket operatively connected between a retainer housing and said support beam comprising the following steps:

positioning a retainer housing including a compartment for accommodating a folded air bag within the instrument panel of a vehicle and disposed adjacent to an opening therein for permitting said folded air bag to be selectively deployed through said opening and into a passenger compartment of a vehicle;

mounting a closure member for covering said opening in said instrument panel, said closure member having an overlapping edge for engaging an area of said instrument panel surrounding said opening;

fixing the closure member relative to the instrument panel with a fixing frame for mounting the overlapping edge of said closure member to the area surrounding said opening in the instrument panel; and securing the retainer housing to the support beam by means of said adjustment bracket for adjustably fixing the retainer housing to the support beam for aligning said closure member and said retainer housing relative to said opening in the instrument panel.

9. A mounting structure for a passenger air bag assembly comprising:

a retainer housing including a compartment for accommodating a folded air bag, said retainer housing being adapted to be mounted beneath an instrument panel of a vehicle and disposed adjacent to an opening therein for permitting said folded air bag to be selectively deployed through said opening and into a passenger compartment of a vehicle;

a closure member for covering said opening in said instrument panel, said closure member having an overlapping edge for engaging an area of said instrument panel surrounding said opening;

a fixing frame mounted on said instrument panel for securing the overlapping edge of said closure member to the area surrounding said opening in the instrument panel;

a support beam mounted beneath said instrument panel for supporting said retainer housing, said support beam including a first end and a second end, at least one of said first and said second ends being affixed to a frame member of the vehicle; and an adjustment bracket disposed between said retainer housing and said support beam for adjustably fixing the retainer housing to the support beam for providing two degrees of movement of said retainer housing relative to said support beam for aligning said closure member relative to said opening in the instrument panel.

10. The mounting structure according to claim 9, wherein said fixing frame is constructed of a resilient material for biasing said closure member to engage said area adjacent to the opening in the instrument panel.

11. The mounting structure according to claim 9, wherein said closure member includes an outer surface layer, a cushion pad layer and a base plate for reinforcing side edges of the closure member.

12. The mounting structure according to claim 11, wherein said cushion pad layer is constructed of a urethane foam material.

13. The mounting structure according to claim 11, wherein said base plate includes an engaging edge section for engaging the area adjacent to the opening in the instrument panel.

14. The mounting structure according to claim 9, wherein said adjustment bracket includes a first leg having an elongated aperture disposed therein and a second leg affixed to said first leg at a predetermined angle relative thereto, said second leg including a second aperture disposed therein, said first and second apertures facilitating an adjustment of said retainer housing and said closure member relative to said opening in said instrument panel.

15. The mounting structure according to claim 9, and further including a hanger for mounting said second end of said support bracket relative to a frame member of the vehicle.

16. A method of installing a passenger air bag assembly to a support beam disposed beneath an instrument panel of a vehicle for supporting said retainer housing, said support beam including a first end and a second end, with at least one of said first and said second ends being affixed to a frame member of the vehicle, said support beam including an adjustment bracket operatively connected between a retainer housing and said support beam comprising the following steps:

positioning a retainer housing including a compartment for accommodating a folded air bag within the instrument panel of a vehicle and disposed adjacent to an opening therein for permitting said folded air bag to be selectively deployed through said opening and into a passenger compartment of a vehicle;

mounting a closure member for covering said opening in said instrument panel, said closure member having an overlapping edge for engaging an area of said instrument panel surrounding said opening;

fixing the closure member relative to the instrument panel with a fixing frame for mounting the overlapping edge of said closure member to the area surrounding said opening in the instrument panel; and securing the retainer housing to the support beam by means of said adjustment bracket for adjustably fixing the retainer housing to the support beam for providing two degrees of movement of said retainer housing relative to said support beam for aligning said closure member and said retainer housing relative to said opening in the instrument panel.

17. A mounting structure for a passenger air bag assembly comprising:

a retainer housing including a compartment for accommodating a folded air bag, said retainer housing being adapted to be mounted beneath an instrument panel of a vehicle and disposed adjacent to an opening therein for permitting said folded air bag to be selectively deployed through said opening and into a passenger compartment of a vehicle;

a closure member for covering said opening in said instrument panel, said closure member having an overlapping edge for engaging an area on an upper surface of said instrument panel surrounding said opening;

a fixing frame mounted on said instrument panel for securing the overlapping edge of said closure member to the area on the upper surface of said instrument panel surrounding said opening;

a support beam mounted beneath said instrument panel for supporting said retainer housing, said support beam including a first end and a second end, at least one of said first and said second ends being affixed to a frame member of the vehicle; and an adjustment bracket disposed between said retainer housing and said support beam for adjustably fixing the retainer housing to the support beam for aligning said closure member relative to said opening in the instrument panel.

* * * * *